March 12, 1940. E. W. SMITH 2,193,783
POSITIVE PLATE WITH PURE LEAD-COATED GRID
Filed Dec. 7, 1937

INVENTOR
Edward W. Smith
BY
Augustus B. Stoughton
ATTORNEY.

WITNESS:
Robt. R. Mitchel.

Patented Mar. 12, 1940

2,193,783

UNITED STATES PATENT OFFICE 2,193,783

POSITIVE PLATE WITH PURE LEAD-COATED GRID

Edward Wanton Smith, Philadelphia, Pa., assignor to The Electric Storage Battery Company, Philadelphia, Pa., a corporation of New Jersey Application December 7, 1937, Serial No. 178,489

3 Claims. (Cl. 136—64)

In batteries of the lead-sulphuric acid type, it has been common practice to use grids for both positive and negative plates consisting of lead alloyed with antimony and small amounts of other metals, such alloy being characterized by greater stiffness than pure lead, thus minimizing tendency toward growth and buckling.

It has long been recognized, however, that one serious disadvantage results from the use of this alloy, namely, that, with the slow oxidation of the positive grid metal, the antimony is gradually liberated in the electrolyte, and part of this liberated antimony finds its way to the negative plates and is there deposited. Owing to its electrochemical characteristics, this antimony, under certain operating circumstances, may set up the condition of a local couple with the result that local action occurs at the negative plates, which thus become subject to self-discharge, sometimes in a very gradual but cumulative manner, eventually resulting in serious impairment of the functioning of the negative plates.

It has been supposed that this local action was principally due to antimony deposited in the sponge lead which constitutes the active material of the negative plate. I have discovered by recent research that, although antimony may be deposited pretty generally on all parts of the negative plates after protracted usage, it is deposited in greater quantity or in more active condition upon the exposed surfaces of the alloy grids than upon the active material, or on other exposed surfaces of pure lead, as in the box design. This is demonstrated by the fact that hydrogen gas, liberated as a result of self-discharge of the negative plate, is always given off in far larger volume from the exposed alloy bars and frames of the grid. This holds for all kinds of negative plates having exposed surfaces of antimony alloy, for new plates where local action is relatively little and to even greater extent with old plates that are badly contaminated with antimony. The local action, as evidenced by the gassing, increases with age, and consequent deposit of antimony, and as I have discovered is intimately connected with the exposed surfaces of the grid bars and frames. The hydrogen is liberated freely from the grid bars, while the exposed surfaces of active material and of perforated pure lead in the box design remain by comparison almost free from gassing even during extensive service.

The exposed alloy surfaces, in combination with the antimony deposited upon them, thus constitute one pole of the local couple which causes self-discharge, the sponge lead constituting the other pole.

The present invention meets this problem by preventing the escape of antimony from the positive grids. To accomplish this, I employ composite grids, which have their interiors of lead alloy having the necessary physical qualities, while the exterior surfaces consist of pure lead. During service, the pure lead surfaces are slowly attacked by electrolytic action, but in many kinds of service the rate of attack is so extremely slow that a lead surface or covering of moderate thickness is sufficient to prevent attack upon the lead alloy of the interior parts during normal life.

It is obvious that, so long as the covering layer of lead remains intact, no antimony can be released from the alloy and hence there can be no antimony deposit upon the negatives with consequent self-discharge.

For a further exposition of my invention, reference may be had to the annexed drawing and specification at the end whereof the novel features of my invention will be specifically pointed out and claimed.

Figure 1:
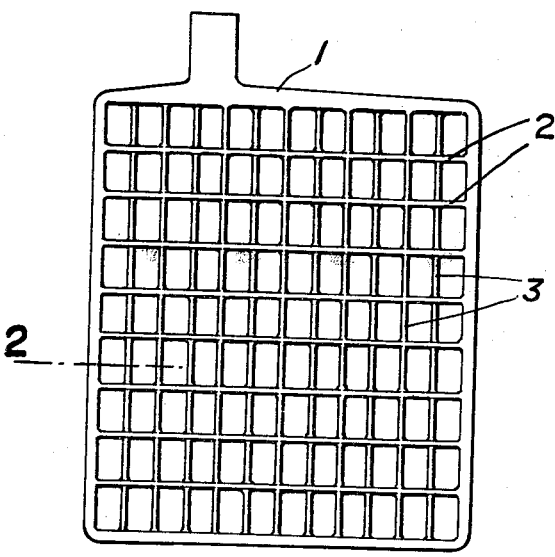
Fig. 1 is a side elevation of a grid having staggered, horizontal and vertical bars.
Figure 2:
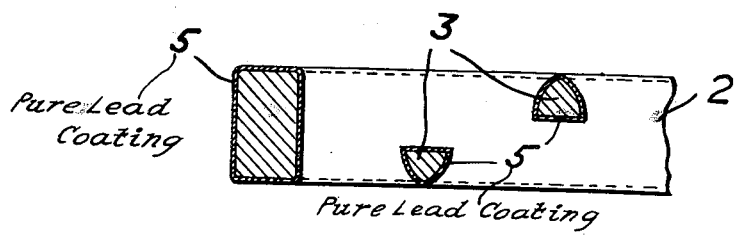
Fig. 2 is a cross-section on line 2 of Fig. 1 on an enlarged scale.

In that embodiment of my invention chosen from among others for illustration in the drawing and description, my device is shown as consisting of a positive plate having a grid 1 formed of a number of horizontal cross-bars 2 and a number of vertical cross-bars 3. The cross-bars 2 and 3 form between them a plurality of interstices which are filled with a paste of lead oxide or oxides which forms the active material of the plate. The grid thus forms a mechanical support for the active material and a conductor for the current from the surfaces of the active material which contact with the electrolyte. The grid is customarily formed of lead-antimony alloy. As best seen in Fig. 2 in the present invention, the grid has a covering 5 of pure lead which protects the alloy parts from contact with the electrolyte, and hence prevents escape of the antimony to the negative plate where it would cause local action. The grid may be made by first casting an alloy grid of suitable composition and then applying an adherent covering 5 of pure lead by electro-deposition or other appropriate process. The electro-plating process is especially suitable since it gives a thicker coating at the exposed surfaces and edges where the attack on the grid is most severe. By "pure lead" is meant not necessarily chemically pure lead but pure in the sense that it conforms to the ordinary specifications of pure lead.

I do not intend to be limited save as the scope of the attached claims and of the prior art may require.

I claim:

1. As a means for inhibiting local action, a plate for a storage battery having a composite grid with interior of lead alloyed with antimony and with integral exterior surfaces of pure lead.

2. As a means for inhibiting local action, a plate for a storage battery having a composite grid, the body of which consists of lead antimony alloy and the surface of which consists of electro-chemically deposited pure lead.

3. In a storage battery cell containing an electrolyte the combination of a positive plate containing antimony, a negative plate having a grid containing antimony and upon which antimony if present in the electrolyte deposits in a form calculated to promote local action and self-discharge, and means for inhibiting the release of antimony from the positive plate into the electrolyte comprising a coating of pure lead applied to the exposed surface of the grid of the positive plate.

EDWARD WANTON SMITH.